(12) United States Patent
Louwet et al.

(10) Patent No.: US 6,632,472 B2
(45) Date of Patent: Oct. 14, 2003

(54) REDISPERSABLE LATEX COMPRISING A POLYTHIOPHENE

(75) Inventors: Frank Louwet, Diepenbeek (BE); Raf Samijn, Wilrijk (BE)

(73) Assignee: Agfa-Gevaert (BE)

( * ) Notice: Subject to any disclaimer, the term of this patent is extended or adjusted under 35 U.S.C. 154(b) by 0 days.

(21) Appl. No.: 09/892,011

(22) Filed: Jun. 26, 2001

(65) Prior Publication Data

US 2002/0016440 A1 Feb. 7, 2002

Related U.S. Application Data

(60) Provisional application No. 60/214,418, filed on Jun. 28, 2000.

(30) Foreign Application Priority Data

Jun. 26, 2000 (EP) .............................................. 00202218

(51) Int. Cl.$^7$ ................................................ C09D 11/02
(52) U.S. Cl. ................ 427/126.1; 106/31.13; 106/31.92; 523/309; 525/186; 525/189; 427/58; 101/483
(58) Field of Search ......................... 252/500; 523/309; 528/377, 380, 480, 481, 501; 106/31.13, 31.92, 31.97; 525/186, 189; 427/58, 126.1; 101/483, 491

(56) References Cited

U.S. PATENT DOCUMENTS

| | | | |
|---|---|---|---|
| 4,959,162 A | 9/1990 | Armes et al. | |
| 5,104,580 A | 4/1992 | Henry et al. | |
| 5,766,515 A | 6/1998 | Jonas et al. | |
| 6,358,437 B1 | * 3/2002 | Jonas et al. ................. 252/500 |
| 2002/0077450 A1 | * 6/2002 | Kirchmeyer et al. ........ 528/373 |

OTHER PUBLICATIONS

"Chemical Synthesis, Characterization, and Electrochemical Studies of Poly(3,4–ethylenedioxythiophene)/Poly(styrene–4–sulfonate) Composites", Chemistry of Materials, vol. 11, issue 2, pp. 262–268, Feb., 1999.*

Armes et al.; "Dispersions of Electrically Conducting Polypyrrole Particles in Aqueous Media," *J. Chem. Soc., Chem. Commun.* 288–290 (1987).

Search report for EP 00 20 2218, Dec. 1, 2000.

* cited by examiner

*Primary Examiner*—Robert Dawson
*Assistant Examiner*—Marc S Zimmer
(74) *Attorney, Agent, or Firm*—Leydig, Voit & Mayer, Ltd.

(57) ABSTRACT

A redispersible or soluble product, optionally having a solids content higher than 10% by weight, obtainable by freeze drying an aqueous dispersion of a latex comprising a polyanion and a polymer or copolymer of a substituted or unsubstituted thiophene; a printing ink comprising the above product; a coating dispersion or solution comprising the above product; and a method for making an antistatic or electroconductive layer comprising the steps of redispersing or diluting the above product by adding water or an organic solvent so as to obtain a dispersion or solution, optionally adding other ingredients to the coating solution or dispersion and applying the dispersion or solution to an object.

21 Claims, No Drawings

REDISPERSABLE LATEX COMPRISING A POLYTHIOPHENE

CROSS-REFERENCE TO RELATED PATENT APPLICATIONS

This patent application claims the benefit U.S. Provisional Patent Application No. 60/214,418, filed Jun. 28, 2000.

FIELD OF THE INVENTION

The present invention relates to a redispersible or soluble product obtainable by freeze drying an aqueous dispersion of a latex comprising a polyanion and a polymer or copolymer of a substituted or unsubstituted thiophene.

BACKGROUND OF THE INVENTION

The preparation of polythiophenes and dispersions thereof for use in antistatic coatings has been described in the literature e.g. 'Handbook of Organic Conductive Molecules and Polymers', ed. H. S. Nalwa, J. Wiley & Sons, 1997. Polythiophenes have conductive properties which can be controlled, for example, by the degree of doping.

FR-A-88 7976 discloses a process for the preparation or electrically conducting polymers based on polythiophenes by chemical polymerization of thiophene in a reaction medium comprising a ferric salt, an alkyl halide and water.

U.S. Pat. No. 5,254,648 discloses a process for the preparation of electrically conductive, doped polythiophene, the process comprising: unsubstituted thiophene, a ferric salt which is effective as a doping agent and as an agent inducing polymerization and which is added to the reaction medium as an anhydrous ferric salt, an alkyl halide present in an amount of less than 0.04 liter per gram thiophene, and water, wherein the water is introduced in an amount ranging between 0.009 and 900% by weight of the alkyl halide, and wherein the water and the anhydrous ferric salt are present in a molar ratio ranging between 0.01 and 6.

WO A-99 25753 describes a method for the preparation of polyanilines, polythiophenes and polypyrroles. EP-A 0 440 957 discloses dispersions of polythiophenes, constructed from structural units of formula (I):

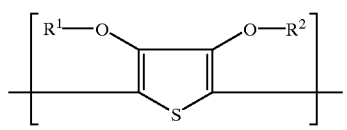

in which $R^1$ and $R^2$ independently of one another represent hydrogen or a $C_{1-4}$-alkyl group or together form an optionally substituted $C_{1-4}$-alkylene residue, in the presence of polyanions.

EP-A-0 686 662 discloses mixtures of A) neutral polythiophenes with the repeating structural unit of formula (I),

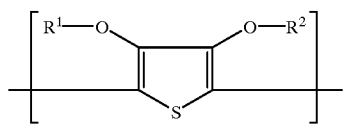

in which $R^1$ and $R^2$ independently of one another represent hydrogen or a $C_{1-4}$-alkyl group or together represent an optionally substituted $C_{1-4}$-alkylene residue, preferably an optionally with alkyl group substituted methylene, an optionally with $C_{1-12}$-alkyl or phenyl group substituted 1,2-ethylene residue or a 1,2-cyclohexene residue, and B) a di- or polyhydroxy- and/or carboxy groups or amide or lactam group containing organic compound; and conductive coatings therefrom which are tempered to increase their resistance preferably to <300 ohm/square.

EP-A 1 081 549 discloses a coating composition comprising a solution of a substituted or unsubstituted thiophene-containing-conductive polymer, a film-forming binder; and an organic solvent media; the media having a water content of less than 37 weight percent. Percentages by weight of poly(3,4-ethylenedioxythiophene) of 0.1% in the coating solution are exemplified.

EP-A 1 081 546 discloses a coating composition of an electrically-conductive polymer (ECP) and an organic solvent media wherein the solvents are selected from the group consisting of alcohols, ketones, cycloalkanes, arenes, esters, glycol ethers and their mixtures; the media having a water content of less than 12 weight percent. Percentages by weight of ECP of 0.02 to 0.18% in the coating solution are exemplified.

EP-A 1 081 548 discloses a coating composition comprising a substituted or unsubstituted thiophene-containing electrically-conductive polymer and an organic solvent media; the media having a water content of less than 12 weight percent. Percentages by weight of poly(3,4-ethylenedioxythiophene) of 0.02 to 0.1% in the coating dispersion are exemplified.

In large scale methods for preparing aqueous dispersions of a latex comprising a polyanion and a polymer or copolymer of a substituted or unsubstituted thiophene the solids content is limited to only a few percent, due to production reasons such as the need for ultrafiltration, the viscosity of the dispersion etc. It should be noted that such dispersions are often erroneously referred to, even in patent texts, as solutions due to their very small particle size, 20 to 50 nm, of the polythiophene/polyanion latex. Shipment of such dilute dispersions is expensive and cumbersome in view of the high volume and weight associated therewith.

Freeze drying has been developed as a method of preserving and increasing the transportability, e.g. in space travel, expeditions and military campaigns, of perishable organic materials such as food, flavours, aroma's, blood products and pharmaceutical formulations. Since the 1960's it has been applied to upwards of 400 foods from meat to fruits and vegetables. This background is reflected in a definition of freeze drying (or lyophilization process) given by T. A. Jennings and H. Duan in 1995 in the Journal of Parenteral Science and Technology, volume 49, no. 6 pp. 272–282, as 'a stabilising process in which a substance is first frozen and then the quantity of solvent is reduced, first by sublimation and then by desorption to values that will no longer support biological activity or chemical reactions'.

It is an object of the present invention to provide a highly concentrated latex of a substituted or unsubstituted polythiophene.

A further aspect of the present invention is the provision of a method of making an antistatic or electroconductive layer.

A still further aspect of the present invention is the provision of a coating solution or dispersion of a latex from a highly concentrated dispersion latex of a polythiophene.

Another aspect of the present invention is the provision of a printing ink from a highly concentrated dispersion latex of a polythiophene.

Further objects and advantages of the present invention will become apparent from the description hereinafter.

BRIEF SUMMARY OF THE INVENTION

Efforts aimed at obtaining concentrated products from a dispersion or solution of a latex comprising a polyanion and a polymer or copolymer of a substituted or unsubstituted thiophene provides solids or films using conventional techniques such as evaporating aqueous dispersions or precipitation produced compositions have shown that, if redispersible in water or organic solvents, redispersion required considerable investment of time and thermal and/or mechanical energy.

Surprisingly it has been found that if freeze-drying, an unconventional concentration technique, is applied to an aqueous dispersion of a latex comprising a polyanion and a copolymer or polymer of a substituted or unsubstituted thiophene, a sponge-like or wool-like powder is produced, which can be rapidly redispersed or dissolved without expenditure of thermal and/or mechanical energy in water or an organic solvent so as to obtain a coating dispersion or solution (optionally adding other ingredients) without leaving a coarse fraction behind. The resulting coating dispersion or solution can be applied to any object, for example a support.

A redispersible or soluble product is provided by the present invention obtainable by freeze drying an aqueous dispersion of a latex comprising a polyanion and a polymer or copolymer of a substituted or unsubstituted thiophene.

A method for making an antistatic or electroconductive layer or pattern is further provided by the present invention comprising the steps of redispersing or diluting the above-mentioned product by adding water or an organic solvent so as to obtain a solution or dispersion; optionally adding other ingredients to the solution or dispersion; and—applying the solution or dispersion to an object.

A coating solution or dispersion is also provided according to the present invention comprising the above-mentioned redispersible or soluble product.

Use of the above-mentioned coating solution or dispersion is also provided by the present invention for preparing an antistatic or electroconductive layer.

A printing ink is also provided according to the present invention comprising the above-mentioned redispersible or soluble product.

Use of the above-mentioned printing ink is also provided by the present invention for preparing an antistatic or electroconductive layer.

DETAILED DESCRIPTION OF THE INVENTION

Freeze drying according to the present invention is a lyophilization process in which a substance is first frozen and then the quantity of solvent (generally water) is reduced, first by sublimation (=primary drying process) and then by desorption (=secondary drying process) until the temperature of the shelves becomes equal to the atmospheric temperature in the freeze dryer. The freeze-drying process is enabled by the ability of solid materials such as ice to sublime (change directly into a gas without passing through a liquid phase) under the right conditions.

The term "dry product" according to the present invention means dry to touch and is associated with no apparent liquid phase.

The term "printing ink" according to the present invention means an ink capable of being applied in a printing process e.g. in flexographic printing, offset printing, driographic printing, inkjet printing, (silk) screen printing.

The term layer according to the present invention means a continuous coating.

The term pattern according to the present invention means a discontinuous coating.

The term "aqueous" as used herein shall be understood as defining dispersions wherein the liquid phase consists of water or water/solvent mixtures provided that the water content is higher by volume than the solvent content.

The electric resistivity of a layer is generally expressed in terms of surface resistivity $R_S$ (unit $\Omega$; often specified as $\Omega$/square). Alternatively, the electroconductivity may be expressed in terms of volume resistivity $R_V = R_S \cdot d$, wherein d is the thickness of the layer, volume conductivity $k_V = 1/R_V$ [unit: S(iemens)/cm] or surface conductivity $k_S = 1/R_S$ [unit: S(iemens).square].

The term 'electroconductive' according to the present invention means having a surface resistivity below $10^6$ $\Omega$/square. $10^6$ $\Omega$/square is typically regarded as a value of surface resistivity which distinguishes electroconductive materials from antistatic materials. Antistatic materials typically have a surface resistivity in the range from $10^6$ to $10^{11}$ $\Omega$/square and are not suitable as an electrode.

Conductivity enhancement refers to a process in which contact with high boiling point liquids such as di- or polyhydroxy- and/or carboxy groups or amide or lactam group containing organic compound optionally followed by heating at elevated temperature, preferably between 100 and 250° C., during preferably 1 to 90 seconds, results in conductivity increase. Alternatively, in the case of aprotic compounds with a dielectric constant $\geq 15$, e.g. N-methyl-pyrrolidinone, temperatures below 100° C. can be used. Such conductivity enhancement is observed with polythiophenes and can take place during the preparation of a layer or subsequently. Particularly preferred liquids for such treatment are N-methyl-pyrrolidinone and diethylene glycol such as disclosed in EP-A 686 662 and EP-A 1 003 179.

Freeze-drying

According to the present invention a redispersible or soluble product obtainable by freeze drying an aqueous dispersion of a latex comprising a polyanion and a polymer or copolymer of a substituted or unsubstituted thiophene is provided.

The first step in freeze-drying a product is to convert it into a frozen state. During the freezing process, the solvent (water) is preferably crystallized. The formation of ice crystals results in a separation of the solutes and the solvent. Then the ice crystals are removed by sublimation under vacuum conditions. While the sublimation or primary drying process removes most of the water from the frozen matrix, there can still be greater than 5% moisture weight/weight with respect to the freeze-dried product in the cake.

Thereafter the remaining water is removed by desorption. It has been found that the water content of the freeze-dried product, according to the present invention, has a strong effect on the redispersibility thereof. The products are highly hygroscopic. For example, the weight of PEDOT/PSS obtained by drying a 1.2% by weight aqueous dispersion at 102° C. increased by 16 to 23% at room temperature, whereas the weight increase in an exicator was only 8%. Products freeze-dried at room temperature, according to the present invention, typically have a water content of 15 to 20% by weight. Further drying of the freeze-dried product in a vacuum drying cupboard at 110° C. and a drying cupboard at 110° C. results in products, which are more difficult to disperse.

According to a first embodiment of the redispersible or soluble product obtainable by freeze drying according to the present invention, the redispersible or soluble product is a dry, spongy, woolly powder, a concentrated dispersion or a paste. A concentrated dispersion or a paste can be obtained instead of a powder by incomplete freeze-drying of the aqueous dispersion. The redispersible or soluble product as a powder, concentrated dispersion or paste can be dissolved or redispersed by adding water, organic solvent or mixtures of water/solvent optionally with other ingredients such as surfactants and dispersants.

According to a second embodiment of the redispersible or soluble product obtainable by freeze drying according to the present invention, the concentrated dispersion or paste has a solids content higher than 10% by weight.

According to a third embodiment of the redispersible or soluble product obtainable by freeze drying according to the present invention, the concentrated dispersion or paste has a solids content higher than 20% by weight.

According to a fourth embodiment of the redispersible or soluble product obtainable by freeze drying according to the present invention, the concentrated dispersion or paste has a solids content higher than 50% by weight.

A concentrated dispersion in an organic solvent such as diethylene glycol or N-methyl-pyrrolidinone, can, for example, be realized by freeze drying a mixture of the organic solvent and the aqueous dispersion or solution of polythiophene/polyanion to a dispersion of polythiophene/polyanion in the organic solvent.

This concentrated dispersion or paste can be diluted or redispersed to obtain any desired concentration in a similar manner to the powder.

Polymer or Copolymer of a Substituted or Unsubstituted Thiophene

According to a fifth embodiment of the redispersible or soluble product obtainable by freeze drying according to the present invention, the substituted thiophene is substituted in at least one of the 3- or 4-positions substituted with a substituent selected from the group consisting of alkoxy, substituted alkoxy, alkyl, substituted alkyl, aryl and substituted aryl groups or the 3- and 4-positions are linked with an optionally substituted oxy-alkylene-oxy group.

According to a sixth embodiment of the redispersible or soluble product obtainable by freeze drying according to the present invention, the polymer of a substituted thiophene is represented by formula (I):

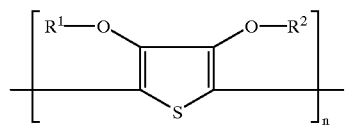

(I)

in which n is larger than 1 and each of $R^1$ and $R^2$ independently represents hydrogen or an optionally substituted $C_{1-4}$ alkyl group or together represent an optionally substituted $C_{1-4}$ alkylene group or an optionally substituted cycloalkylene group, preferably an ethylene group, an optionally alkyl-substituted methylene group, an optionally $C_{1-12}$ alkyl- or phenyl-substituted ethylene group, a 1,3-propylene group or a 1,2-cyclohexylene group.

According to a seventh embodiment of the redispersible or soluble product obtainable by freeze drying according to the present invention, the polymer or copolymer of a substituted thiophene is a polymer or copolymer of a (3,4-dialkoxy-thiophene) in which the two alkoxy groups together represent an optionally substituted oxy-alkylene-oxy bridge selected from the group consisting of: (3,4-methylenedioxy-thiophene), (3,4-methylenedioxythiophene) derivatives, (3,4-ethylenedioxythiophene), (3,4-ethylene-dioxythiophene) derivatives, (3,4-propylenedioxythiophene), (3,4-propylenedioxythiophene) derivatives, (3,4-butylene-dioxythiophene) and (3,4-butylenedioxy-thiophene) derivatives and copolymers therewith.

According to a eighth embodiment of the redispersible or soluble product obtainable by freeze drying according to the present invention, the polymer or copolymer of a substituted thiophene is a polymer or copolymer of a (3,4-dialkoxy-thiophene) in which the two alkoxy groups together represent an oxy-alkylene-oxy bridge substituted with a substituent selected from the group consisting of alkyl, alkoxy, alkyloxyalkyl, carboxy, alkylsulfonato and carboxy ester groups.

According to a ninth embodiment of the redispersible or soluble product obtainable by freeze drying according to the present invention, the polymer of a substituted thiophene is a poly(3,4-dialkoxy-thiophene) in which the two alkoxy groups together represent an optionally substituted oxy-alkylene-oxy bridge which is a 1,2-ethylene group, an optionally alkyl-substituted methylene group, an optionally $C_{1-12}$ alkyl- or phenyl-substituted 1,2-ethylene group, a 1,3-propylene group or a 1,2-cyclohexylene group.

Such polymers are disclosed in Handbook of Oligo- and Polythiophenes Edited by D. Fichou, Wiley-VCH, Weinheim (1999); by L. Groenendaal et al. in Advanced Materials, volume 12, pages 481–494 (2000); L. J. Kloeppner et al. in Polymer Preprints, volume 40(2), page 792 (1999); P. Schottland et al. in Synthetic Metals, volume 101, pages 7–8 (1999); and D. M. Welsh et al. in Polymer Preprints, volume 38(2), page 320 (1997).

The preparation of such a polythiophene and of aqueous dispersions containing such a polyanion and a polymer or copolymer of a substituted thiophene is described in EP-A-440 957 and corresponding U.S. Pat. No. 5,300,575. Basically the preparation of polythiophene proceeds in the presence of polymeric polyanion compounds by oxidative polymerisation of 3,4-dialkoxythiophenes or 3,4-alkylenedioxythiophenes according to formula (II):

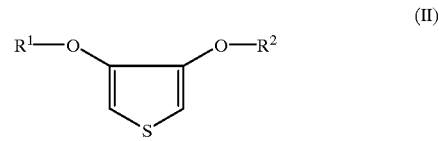

(II)

wherein $R^1$ and $R^2$ are as defined for formula (I).

Stable aqueous dispersions of a polymer or a copolymer of a substituted or unsubstituted thiophene can be obtained by dissolving thiophenes, e.g. those corresponding to formula (II), a polyacid and an oxidising agent in water, optionally containing an organic solvent, optionally containing a comonomer, and then stirring the resulting solution or emulsion at 0° C. to 100° C. until the polymerisation reaction is completed. The polymer or copolymer of a substituted or unsubstituted thiophene formed by the oxidative polymerisation is positively charged, the location and number of such positive charges being not determinable with certainty and therefore not mentioned in the general formula of the repeating units of the polymer or copolymer of a substituted or unsubstituted thiophene.

Suitable oxidising agents are those that are typically used for the oxidative polymerisation of aromatic monomers such as pyrrole, thiophene and aniline. Preferred oxidising agents are iron (III) salts, e.g. $FeCl_3$, $Fe(ClO_4)_3$ and the iron (III) salts of organic acids and inorganic acids containing organic residues or combinations thereof. Other suitable oxidising agents are $H_2O_2$, $K_2Cr_2O_7$, alkali or ammonium persulfates, alkali perborates, potassium permanganate and copper salts such as copper tetrafluoroborate. Air or oxygen can also be used as oxidising agents. Theoretically, 2.25 equivalents of oxidising agent per mol of thiophene are required for the oxidative polymerisation thereof (J. Polym. Sci. Part A, Polymer Chemistry, Vol. 26, p.1287, 1988). In practice, however, the oxidising agent is used in excess, for example, in excess of 0.1 to 2 equivalents per mol of thiophene.

Polyanion

The polyanions of the redispersible or soluble product obtainable by freeze drying according to the present invention are disclosed in EP-A 440 957 and are formed from polyacids or can be added as a salt of the corresponding polyacids, e.g. an alkali salt.

According to a tenth embodiment of the redispersible or soluble product obtainable by freeze drying according to the present invention, the polyanion is the anion of a polymeric carboxylic acids, such as poly(acrylic acid), poly (methacrylic acid) and poly(maleic acid), or of a polymeric sulphonic acid, such as poly(styrene sulphonic acid) or poly(vinyl sulphonic acid). These polycarboxylic acids and polysulphonic acids can also be copolymers of vinylcarboxylic acids and vinylsulphonic acids with other polymerizable monomers, e.g. acrylic acid esters, methacrylic acid esters and styrene.

According to an eleventh embodiment of the redispersible or soluble product obtainable by freeze drying according to the present invention, the polyanion is the anion of poly (styrene sulphonic acid) or of copolymers thereof with styrene.

The molecular weight of these polyanion forming polyacids is preferably between 1000 and $2\times10^6$, more preferably between 2000 and $5\times10^5$. These polyacids or their alkali salts are commercially available and can be prepared according to the known methods, e.g. as described in Houben-Weyl, Methoden der Organische Chemie, Bd. E20 Makromolekulare Stoffe, Teil 2, (1987), pp. 1141.

A coating solution or dispersion is realized according to the present invention comprising a redispersible or soluble product, which may be a powder, paste or concentrated dispersion, obtainable by freeze drying an aqueous dispersion of a latex comprising a polyanion and a polymer or copolymer of a substituted or unsubstituted thiophene.

According to a first embodiment of the coating solution or dispersion according to the present invention, the coating solution or dispersion further comprises water or an organic solvent.

According to a second embodiment of the coating solution or dispersion according to the present invention, the coating solution or dispersion has a concentration of the latex comprising a polyanion and a polymer or copolymer of a substituted or unsubstituted thiophene of at least 2% by weight of the coating solution or dispersion.

According to a third embodiment of the coating solution or dispersion according to the present invention, the coating solution or dispersion has a concentration of the latex comprising a polyanion and a polymer or copolymer of a substituted or unsubstituted thiophene of at least 5% by weight of the coating solution or dispersion.

According to a fourth embodiment of the coating solution or dispersion according to the present invention, the coating solution or dispersion has a concentration of the latex comprising a polyanion and a polymer or copolymer of a substituted or unsubstituted thiophene of at least 10% by weight of the coating solution or dispersion.

According to a fifth embodiment of the coating solution or dispersion according to the present invention, the coating solution or dispersion has a concentration of the latex comprising a polyanion and a polymer or copolymer of a substituted or unsubstituted thiophene of at least 1% by weight of the coating solution or dispersion and a water content of less than 12% by weight of the coating solution or dispersion.

According to a sixth embodiment of the coating solution or dispersion according to the present invention, the coating solution or dispersion has a concentration of the latex comprising a polyanion and a polymer or copolymer of a substituted or unsubstituted thiophene of at least 1% by weight of the coating solution or dispersion and a water content of less than 6% by weight of the coating solution or dispersion.

According to a seventh embodiment of the coating solution or dispersion according to the present invention, the coating solution or dispersion can be used for preparing an antistatic or electroconductive layer.

The coating solution or dispersion may comprise additional ingredients, such as a hardening agent e.g. an epoxysilane, such as 3-glycidyloxypropyl-triethoxy-silane, as described in EP-A 564 911, which is especially suitable when coating on a glass substrate; one or more surfactants; spacing particles; adhesion promoting agents, UV-filters or IR-absorbers.

A printing ink is realized according to the present invention comprising a redispersible or soluble product, which may be a powder, paste or concentrated dispersion, obtainable by freeze drying an aqueous dispersion of a latex comprising a polyanion and a polymer or copolymer of a substituted or unsubstituted thiophene.

According to a first embodiment of the printing ink according to the present invention further comprising water or an organic solvent.

According to a second embodiment of the printing ink according to the present invention, the printing ink has a concentration of the latex comprising a polyanion and a polymer or copolymer of a substituted or unsubstituted thiophene of at least 2% by weight of the printing ink.

According to a third embodiment of the printing ink according to the present invention, the printing ink has a concentration of the latex comprising a polyanion and a polymer or copolymer of a substituted or unsubstituted thiophene of at least 5% by weight of the printing ink.

According to a fourth embodiment of the printing ink according to the present invention, the printing ink has a concentration of the latex comprising a polyanion and a polymer or copolymer of a substituted or unsubstituted thiophene of at least 10% by weight of the printing ink.

According to a fifth embodiment of the printing ink according to the present invention, the printing ink has a concentration of the latex comprising a polyanion and a polymer or copolymer of a substituted or unsubstituted thiophene of at least 1% by weight of the printing ink and a water content of less than 12% by weight of the printing ink.

According to a sixth embodiment of the printing ink according to the present invention, the printing ink has a concentration of the latex comprising a polyanion and a polymer or copolymer of a substituted or unsubstituted thiophene of at least 1% by weight of the printing ink and a water content of less than 6% by weight of the printing ink.

The printing ink may comprise additional ingredients, such as one or more binders, a hardening agent e.g. an epoxysilane, such as 3-glycidoxypropyltrimethoxysilane, as described in EP-A 564 911, which is especially suitable when coating on a glass substrate; one or more surfactants; one or more dispersants; spacing particles; adhesion promoting agents, UV-filters or IR-absorbers. Suitable polymer binders are described in EP-A 564 911.

Lithographic inks have viscosities of about 15 Pa.s to 35 Pa.s depending upon the ink formulation, drying mechanism, printing machine and speed of printing. Gravure and flexographic inks vary greatly, but a typical press-ink viscosity is about 15 mPa.s. Typical viscosities of screen printing inks are about 2 Pa.s. Inkjet inks vary in viscosity from about 2 mPa.s to 20 mPa.s depending upon the type of inkjet process, nozzle construction, printing speed, ink-drying mechanism and print quality required. Hot-melt inkjet inks are solid at room temperature and are normally printed at about 150° C., when their viscosity is of the order of 40 mPa.s.

Non-transparent printing inks can be realized by additionally incorporating a pigment such as LEVACRYL® A-SF, a black pigment from BAYER, in a weight sufficient to give non-transparency in the layer thickness being coated.

Layers of the printing inks exhibit excellent adhesion to phosphor layers, polyacrylate subbing layers, polycarbonate and polyesters e.g. poly(ethene terephthalate) with surface resistances $\leq 1000$ Ω/square at visual light transmissions >75%, with $\geq 85\%$ being obtainable.

Binder

According to a twelfth embodiment of the redispersible or soluble product obtainable by freeze drying, according to the present invention, the product further comprises a binder.

According to a thirteenth embodiment of the redispersible or soluble product according to the present invention, the product further comprises a binder having a glass transition temperature above 25° C.

According to an eighth embodiment of the coating solution or dispersion according to the present invention, the coating solution or dispersion further comprises a binder or a thickener.

According to a seventh embodiment of the printing ink according to the present invention, the printing ink further comprises a binder or thickener.

Suitable binders for use in the present invention are described in EP-A 564 911, which is hereby incorporated by reference, and include water-soluble polymers, such as poly(vinyl alcohol), water-soluble homo- and co-polymers of acrylic acid and homo- and co-polymers of methacrylic acid, and polymer latexes.

Suitable thickeners are polyacrylates and polysaccharides. Preferred polyacrylate thickeners are high molecular weight homo- and copolymers of acrylic acid crosslinked with a polyalkenyl polyether such as the CARBOPOL® resins of B. F. Goodrich with CARBOPOL® ETD-2623 being particularly preferred. Preferred polysaccharide thickeners include cellulose, cellulose derivatives e.g. carboxymethyl cellulose, silica, guar gum and xanthan gum, with xanthan gum being particularly preferred e.g. BIOSAN® S from Hercules Inc., USA and Kelzan® T from MERCK & Co., Kelco Division, USA.

Particularly preferred binders and thickeners for use in the redispersible or soluble product, coating solution, coating dispersion or printing ink, according to the present invention, are:
POLYVIOL™ WX48 20=a poly(vinyl alcohol) from WACKER CHEMIE
CARBOPOL™ ETD2623=an acrylic acid copolymer crosslinked with a polyalkenyl polyether from B. F. Goodrich;
CERIDUST™ 130=a polyethylene wax from Hoechst;
JONREZ™ SM700=a rosin based resin from Johnson Polymer;
JONREZ™ SM705=a rosin based resin from Johnson Polymer;
JONREZ™ SM729=a rosin based resin from Johnson Polymer;
KLUCEL™ H=a hydroxypropylcellulose from Hercules Inc.;
NEOCRYL™ BT24=an alkaline-soluble acrylic copolymer from Zenica Resins Preferred water-soluble binders include poly(vinyl alcohol) and homo- and co-polymers of hydroxyethyl methacrylate and copolymers of 2-propenoic acid 2-phosphonooxy)ethyl ester and copolymers of 2-methyl-2-propenoic acid 2-phosphonooxy)ethyl ester. Preferred polymer latexes are homo- or co-polymers of a monomer selected from the group consisting of styrene, acrylates, methacrylates and dienes e.g. isoprene and butadiene. Particularly preferred polymer latexes for use in the redispersible or soluble product, coating solution, coating dispersion or printing ink, according to the present invention, are:
LATEX01=poly(methyl methacrylate) latex with a particle size of 90 nm, available as a 20% by weight aqueous dispersion;
LATEX02=copolyester latex of 26,5 mol % terephthalic acid, 20 mol % isophthalic acid, 3.5 mol % sulfoisophthalic acid and 50 mol % ethylene glycol, available as a 20% by weight aqueous dispersion;
LATEX03=vinylidene chloride, methyl methacrylate, itaconic acid (88/10/2) terpolymer, available as 30% by weight aqueous dispersion;
LATEX04=a copolymer of 80% ethyl acrylate and 20% methacrylic acid, available as a 27% by weight aqueous dispersion;
LATEX05=a copolymer of 49% methyl methacrylate, 49% of butadiene and 2% itaconic acid, available as a 30% by weight aqueous dispersion;
LATEX06=a poly(ethyl acrylate), available as a 30% by weight aqueous dispersion.

LATEX03, LATEX04, LATEX05 and LATEX06 all have glass transition temperatures below 25° C. Such binders may be treated with a hardening agent, e.g. an epoxysilane such as 3-glycidyloxypropyltrimethoxysilane as described in EP-A 564 911, which is especially suitable when coating on a glass substrate.

Surfactant

According to a fourteenth embodiment of the redispersible or soluble product obtainable by freeze drying, according to the present invention, the product further comprises a surfactant.

According to a ninth embodiment of the coating solution or dispersion according to the present invention, the coating solution or dispersion further comprises a surfactant.

According to an eighth embodiment of the printing ink according to the present invention, the printing ink further comprises a surfactant.

Anionic and non-ionic surfactants are preferred. Suitable surfactants for use in the redispersible or soluble product, redispersible or soluble product, coating solution, coating dispersion or printing ink, according to the present invention, are:

Surfactant No 01=perfluoro-octanoic acid ammonium salt, available as a 30% solution;

Surfactant No 02=MARLON™ A365, supplied as a 65% concentrate of a sodium alkyl-phenylsulfonate by HÜLS;

Surfactant No 03=AKYPO™ OP80, supplied as an 80% concentrate of an octyl-phenyl-oxy-polyethyleneglycol (EO 8)acetic acid by CHEMY;

Surfactant No 04=ARKOPAL™ N060 (previously HOSTAPAL™ W), a nonylphenylpolyethylene-glycol from HOECHST;

Surfactant No 05=ZONYL™ FSO 100, a block copolymer of polyethyleneglycol and polytetrafluoroethene with the structure: $F(CF_2CF_2)_yCH_2CH_2O(CH_2CH_2O)_xH$, where x=0 to ca. 15 and y=1 to ca. 7 from DUPONT, supplied as a 5 wt. % solution;

Surfactant No 06=HOSTAPAL™ B, a sodium trisalkylphenyl-polyethyleneglycol(EO 7-8)sulphate from HOECHST, supplied as a 50% concentrate;

Surfactant No 07=ARKOPON™ T, a sodium salt of N-methyl-N-2-sulfoethyl-oleylamide from HOECHST, supplied as a 40% concentrate;

Surfactant No 08 MERSOLAT™ H76, a sodium pentadecylsulfonate from BAYER, supplied as a 76% concentrate;

Surfactant No 09=SURFINOL™ 485, an ethoxylated acetylenic diol surfactant from Air Products.

Conductivity Enhancing Agent

According to a fifteenth embodiment of the redispersible or soluble product obtainable by freeze drying, according to the present invention, the product further comprises a conductivity enhancing agent.

According to a tenth embodiment of the coating solution or dispersion, according to the present invention, the coating solution or dispersion further comprises a conductivity enhancing agent.

According to a ninth embodiment of the printing ink according to the present invention, the coating solution or dispersion further comprises a conductivity enhancing agent.

Suitable conductivity enhancing agents are linear, branched or cyclic aliphatic $C_{2-20}$ hydrocarbon or an optionally substituted aromatic $C_{6-14}$ hydrocarbon or a pyran or a furan, said organic compound comprising at least two hydroxy groups or at least one —COX or —CONYZ group, wherein X denotes —OH and Y and Z independently of one another represent H or alkyl; or a heterocyclic compound containing at least one lactam group.

Examples of such organic compounds for use in the redispersible or soluble product, coating solution, coating dispersion or printing ink, according to the present invention, are e.g. N-methyl-2-pyrrolidone, 2-pyrrolidone, 1,3-dimethyl-2-imidazolidone, N,N,N',N'-tetramethylurea, formamide, dimethylformamide, and N,N-dimethylacetamide. Preferred examples are sugar or sugar derivatives such as arabinose, saccharose, glucose, fructose and lactose, or di- or polyalcohols such as sorbitol, xylitol, mannitol, mannose, galactose, sorbose, gluconic acid, ethylene glycol, di- or tri(ethylene glycol), 1,1,1-trimethylolpropane, 1,3-propanediol, 1,5-pentanediol, 1,2,3-propanetriol, 1,2,4-butanetriol, 1,2,6-hexanetriol, or aromatic di- or polyalcohols such as resorcinol.

Particularly preferred conductivity enhancing agents for use in the coating solution or dispersion or printing ink according to the present invention are: N-methyl-pyrrolidinone and diethylene glycol.

Support

Suitable supports for use in the method of the present invention are polymeric films such as poly(ethylene terephthalate), poly(ethylene naphthalate), polystyrene, polyethersulphone, polycarbonate, polyacrylate, polyamide, polyimides, cellulosetriacetate, polyolefines, polyvinylchloride, etc. Also inorganic substrates can be used such as silicon, ceramics, oxides, glass, polymeric film reinforced glass, glass/plastic laminates.

INDUSTRIAL APPLICATIONS

The redispersible or soluble product obtainable by freeze drying an aqueous dispersion of a latex comprising a polyanion and a polymer or copolymer of a substituted or unsubstituted thiophene, according to the present invention, can be used in various applications. The dispersions or solutions, printing ink and coated layers obtained therefrom can be used for making electrodes that can be used in various electrical or semiconductor devices.

Preferred applications for the electroconductive layers prepared with dispersions are photovoltaic cells, electroluminescent devices such as organic or inorganic light-emitting diodes, and displays, especially flat panel displays such as LCDs.

The resistivity of the electroconductive layer comprising a polythiophene prepared according to the present invention is sufficiently low to be used as electrode in a device that draws or generates a small current, such as a solar cell. However, devices that may draw a higher current, such as LEDs, may require an electrode wherein the organic electroconductive layer is combined with another layer having a better conductivity, e.g. an ITO layer. Other embodiments are disclosed in EP-A 1 013 413 and EP-A 0 554 588.

While the present invention will hereinafter be described in connection with preferred embodiments thereof, it will be understood that it is not intended to limit the invention to those embodiments. The ingredients used in the EXAMPLES and not mentioned above are summarized below:

ECCOCOAT™ CC-2=a conductive polymer from Emerson & Cumming Speciality Polymers

Z6040=3-glycidoxypropyltrimethoxysilane from Dow Corning.

The following examples further illustrate the invention but, of course, should not be construed as in any way limiting its scope.

EXAMPLE 1

Preparation of the Polythiophene Dispersion

An aqueous dispersion of poly(3,4-ethylenedioxythiophene) [PEDOT] and polystyrene sulphonate [PSS] as a polyanion was prepared according to the method described in EP-A 1 079 397. The dispersion thus obtained, having a solids content of 1.15% by weight and a mean particle size by weight determined with a Chemical Process Specialists (CPS) DCP20000 disc centrifuge measurements using 8% sucrose in water to be ca. 50 nm with the major peak at ca. 25 nm. Table 1 gives particle size distribution characteristics for several representative PEDOT/PSS dispersions.

TABLE 1

| mean particle size by weight [nm] | maximum of main peak [nm] | halfwidth of main peak [nm] | 90% by wt. of particles have sizes less than [nm] |
|---|---|---|---|
| 47 | 25 | 35 | 58 |
| 46 | 25 | 33 | 58 |
| 53 | 25 | 32 | 70 |
| 53 | 22 | 29 | 90 |
| 54 | 23 | 30 | 90 |
| 48 | 25 | 29 | 63 |
| 50 | 23 | 24 | 70 |
| 47 | 25 | 26 | 58 |

EXAMPLE 2

Isolation of PEDOT/PSS from Polythiophene Dispersions by Evaporation

Preliminary evaporation experiments with 1.2% aqueous dispersions of poly(3,4ethylenedioxythiophene)/poly(styrene sulphonic acid) [PEDOT/PSS] had shown simple evaporation of the liquid present in a solution or dispersion of a latex comprising a polyanion and a polymer or copolymer of a substituted or unsubstituted thiophene provides provided a solid or films which could not be easily redispersed by adding water.

100 g of a particular 1.1% aqueous dispersion of PEDOT/PSS was mixed with aqueous solutions of Surfactant No. 01, 02, 03, 04 or 05 or aqueous dispersions of LATEX01, LATEX02, LATEX03 or LATEX06 or solid poly(vinyl alcohol) containing the solids quantities given in Table 2 to produce the mixtures of Samples II to IX. Sample I was 100 g of the same 1.1% aqueous dispersion of PEDOT/PSS.

treatment with an Ultra-Turrax™ followed by two passes through a GAULIN homogenizer and one pass through a MICROFLUIDIZER™ at 400 bar. The redispersed evaporated PEDOT/PSS dispersion was mixed with N-methyl-pyrrolidinone, Zonyl FSO 100, Z6040, LATEX03 and coated onto a subbed PEDOT/PSS support to produce the layer composition given in Table 3.

TABLE 3

| PEDOT/PSS | 28.9 mg/m$^2$ |
| Zonyl FSO 100 | 8 mg/m$^2$ |
| Z6040 | 100 mg/m$^2$ |
| LATEX03 | 100 mg/m$^2$ |
| N-methyl-pyrrolidinone | [2 mL/m$^2$]* |

*theoretically present but evaporates during drying process thereby producing conductivity enhancement which exhibited a surface resistivity of 1800 Ω/square, which was comparable with the surface resistivity of 1700 Ω/square of a layer coated with the original PEDOT/PSS-dispersion with the same composition.

These experiments showed that redispersion is possible after evaporation, but only with a considerable expenditure of energy and time.

EXAMPLE 3

Isolation of PEDOT/PSS from Polythiophene Dispersions by Freezing

Thawing of a frozen solution or dispersion of a latex comprising a polyanion and a polymer or copolymer of a substituted or unsubstituted thiophene results in phase separation, but separation by a centrifuge or filtration was not possible.

Despite the fact that visually large agglomerates of PEDOT/PSSA were formed upon thawing, handling of the

TABLE 2

| Sample [g] | I | II | III | IV | V | VI | VII | VIII | IX | X | XI |
|---|---|---|---|---|---|---|---|---|---|---|---|
| 1.1% aq. PEDOT/PSS dispersion | 100 | 100 | 100 | 100 | 100 | 100 | 100 | 100 | 100 | 100 | 100 |
| Surfactant No 01 | — | 0.59 | — | — | — | — | — | — | — | — | — |
| Surfactant No 02 | — | — | 0.59 | — | — | — | — | — | — | — | — |
| Surfactant No 03 | — | — | — | 0.59 | — | — | — | — | — | — | — |
| Surfactant No 04 | — | — | — | — | 0.59 | — | 0.02 | — | — | — | — |
| Surfactant No 05 | — | — | — | — | — | 0.59 | — | — | — | — | — |
| Surfactant No 06 | — | — | — | — | — | — | — | — | — | — | — |
| Surfactant No 07 | — | — | — | — | — | — | — | — | — | 0.09 | — |
| Surfactant No 08 | — | — | — | — | — | — | — | 0.02 | — | — | — |
| LATEX01 | — | — | — | — | — | — | 1.1 | — | — | — | — |
| LATEX02 | — | — | — | — | — | — | — | 1.1 | — | — | — |
| LATEX03 | — | — | — | — | — | — | — | — | 1.1 | — | — |
| LATEX06 | — | — | — | — | — | — | — | — | — | 1.1 | — |
| POLYVIOL ™ WX48/20 | — | — | — | — | — | — | — | — | — | — | 1.1 |

Samples I-IX were evaporated in a drying cupboard at 110° C. for 24 hours to produce Sample I-A to IX-A. Sample I-A, the PEDOT/PSS obtained by evaporating Sample I, was found to have a BET specific surface area of 0.5 m$^2$/g.

Redispersion in water of the PEDOT/PSS-samples I-A to IX-A obtained by evaporating Samples I to IX was investigated. Little swelling was observed after 8 hours contact with water except in the case of Sample II-A for which a moderate amount of swelling was observed.

Redispersion of Sample I-A as a blue-black dispersion could be realized by moistening in contact with 1.5 L of deionized water over a period of 48 hours at room temperature, then subjecting the mixture to 10 minutes thawed dispersion with a microfluidizer at 400 bar produced a dispersion which upon coating with the same layer composition as given above exhibited a surface resistivity of 1700 Ω/square, which was comparable with the surface resistivity of 1700 Ω/square of a layer coated with the original PEDOT/PSS-dispersion with the same composition.

Such freezing experiments showed that freezing of itself did not enable isolation of solid PEDOT/PSS.

EXAMPLE 4

Precipitation Of PEDOT/PSS from Aqueous Dispersions by Addition of Non-solvent

Addition of non-solvent did not bring about precipitation of PEDOT/PSS is a form that could be separated by filtration or centrifuging.

EXAMPLE 5

Freeze Drying of the Polythiophene Dispersion

The PEDOT/PSS dispersions of Samples I to XI were freeze dried under high vacuum (0.7 mbar) in a CHRIST BETA2-16 shelf freeze-dryer until all of the water was evaporated (i.e. until the temperature of the shelves was equal to room temperature) and the dry powders I-B to XI-B were obtained.

Two BET measurements were carried out with the powder of Sample I-B yielding BET specific surface areas of 3 and 6 $m^2/g$, which assuming a density of $10^6$ $g/m^3$ (density of water), indicated an average particle size of 1.0 to 2.0 $\mu m$.

The freeze dried powder of Sample I-B was found to contain 79.2% by weight of PEDOT/PSS, 13.0% by weight of water which could be removed upon drying at 200° C., and 7.8% by weight of water which could not be removed upon drying at 200° C.

Redispersion of PEDOT/PSS-samples I-B to XI-B was investigated by contacting with deionized water for 8 hours producing samples I-B-I to XI-B-I with 1.1% by weight of PEDOT/PSS. Visually complete redispersion was observed with all these samples without the expenditure of mechanical or thermal energy, except in the case of Sample III-B (with Surfactant No. 02) for which large agglomerates were visible and Sample VIII-B for which a swollen agglomerate was obtained. The particle size distributions of I-B-I, II-B-I, III-B-I, IV-B-I and V-B-I all obtained without the expenditure of mechanical or thermal energy are given in Table 4 together with the particle size distribution of I, the starting material.

TABLE 4

| Sample | mean particle size by weight [nm] | maximum of main peak [nm] | halfwidth of main peak [nm] | 90% by wt. of particles have sizes less than [nm] |
|---|---|---|---|---|
| I | 54 | 23 | 36 | 84 |
| I-B-I | 68 | 32 | 50 | 114 |
| II-B-I | 95 | 79 | 90 | 161 |
| IV-B-I | 57 | 33 | 44 | 80 |
| V-B-I | 56 | 29 | 40 | 80 |
| VI-B-I | 53 | 28 | 37 | 76 |

These particle size measurements showed complete redispersion in the cases of IV-B-I, V-B-I and VI-B-I, virtually complete redispersion in the case of I-B-I and slight agglomeration in the case of II-B-I. These experiments thus showed the surprising ease of redispersion of freeze dried PEDOT/PSS materials optionally containing surfactant, a polymer latex or a water-soluble polymer without the application of mechanical or thermal energy compared with evaporated PEDOT/PSS-samples.

EXAMPLE 6

Preparation of Aqueous Coating Dispersions XII-B-I

Freeze-dried powder (Sample XII-B) was obtained from a particular 1.1% by weight dispersion of PEDOT/PSS (Sample XII) as described above and redispersed by adding deionized water so as to obtain the following samples having different solids content:

| Sample | Solids content (wt. %) | Viscosity at 25° C. [mPa.s] |
|---|---|---|
| XII-B-I | 1.15 | 96 |
| XII-B-II | 2.30 | 762 |
| XII-B-III | 3.45 | 6612 |

Coating dispersions of the above samples were then prepared. The composition of the coating dispersions, which all contained the same amount of polythiophene, is given in Table 5.

TABLE 5

| | Sample | | | |
|---|---|---|---|---|
| | XIII | XIV | XV | XVI |
| Sample XII [g] | 21.74 | — | — | — |
| Sample XII-B-I [g] | — | 21.74 | — | — |
| Sample XII-B-II [g] | — | — | 10.87 | — |
| Sample XII-B-III [g] | — | — | — | 7.24 |
| LATEX03 [g] | 0.83 | 0.83 | 0.83 | 0.83 |
| ZONYL ™ FSO 100 (5 wt % surfactant from DuPont) [g] | 0.40 | 0.40 | 0.40 | 0.40 |
| N-methyl pyrrolidone [g] | 5.00 | 5.00 | 5.00 | 5.00 |
| Z6040 [g] | 0.25 | 0.25 | 0.25 | 0.25 |
| deionized water [g] | 71.78 | 71.78 | 82.65 | 86.28 |

(*) comparison, polythiophene dispersion before freeze drying

EXAMPLE 6

Preparation of Electroconductive Layers with Samples XIII, XIV, XV and XVI and Electrical Conductivity Measurements The aqueous coating dispersions of samples XIII, XIV, XV and XVI were applied to a subbed polyethylene terephthalate film support by means of a coating knife (50 $\mu m$ wet coating thickness) and dried at 40° C.

The subbed support coated with the electroconductive layer was cut to obtain a strip having a length of 27.5 cm and a width of 35 mm. Electrodes of a conductive polymer, ECCOCOAT CC-2, were applied over the width of the strip a distance of 10 cm apart. The electric resistivity was measured by applying a constant potential between the electrodes, measuring the current flowing through the circuit with a Pico-amperemeter KEITHLEY 485 and calculating the surface resistivity in $\Omega$/square from the potential and the current, taking into account the geometry of the area between the electrodes. The result are given in Table 6.

TABLE 6

Surface Resistivity Of The Electroconductive Layer

| Sample | PEDOT/PSS Sample | Surface resistivity [$\Omega$/square] |
|---|---|---|
| XIII | XII(*) | 1200 |
| XIV | XII-B-I | 1200 |
| XV | XII-B-II | 1550 |
| XVI | XII-B-III | 1575 |

(*)comparison, polythiophene dispersion prior to freeze drying

The results in Table 6 show that all the samples exhibited a comparable surface resistivity, within experimental error. The polythiophene dispersion can thus be freeze dried and redispersed to various concentrations without affecting the electroconductive properties of the layers coated therewith.

Preparation of aqueous coating dispersion I-C-I from freeze dried PEDOT/PSSA with further drying I-C. The freeze-dried powder obtained from the polythiophene dispersion Sample I-B was further dried for 12 hours in a vacuum drying cupboard producing Sample I-C. Upon addition of 2 L of deionized water, the further dried freeze dried powder did not immediately redisperse as for Samples I-B and XII-B. It was allowed to moisten with 2 L of deionized water over a period of 48 hours at room temperature. Then the mixture was subjected to 10 minutes treatment with an Ultra-Turrax™ followed by two passes through a GAULIN homogenizer and one pass through a MICROFLUIDIZER™ at 400 bar, after which a blue-black dispersion was obtained. A coating dispersions of the above sample was then prepared. The composition of the coating dispersion is given in Table 7.

TABLE 7

|  | Sample I-C-I |
|---|---|
| Polythiophene dispersion [g] | 7.24 |
| LATEX03 [g] | 0.83 |
| ZONYL ™ FSO 100 (5 wt. % surfactant from Du Pont) [g] | 0.40 |
| N-methyl pyrrolidone [g] | 5.00 |

EXAMPLE 7

Preparation of the Screen Printing Inks of Samples XVII to XXIII

The freeze-dried powder obtained from the polythiophene dispersion was redispersed by adding different solvents optionally together with CARBOPOL™ ETD2623 followed by predispersion with an ULTRA-TURRAX™ and prolonged ball milling (for duration see Table 8) so as to obtain samples XVII to XXIII with the compositions given in Table 8.

TABLE 8

| Sample | ball milling duration [h] | PEDOT/ PSSA [wt. %] | water [wt %] | solvent medium | [wt. %] | CARBOPOL ETD 2623 [wt. %] |
|---|---|---|---|---|---|---|
| XVII | 24 | 1.19 | 0.31 | diethylene glycol/ carbitol-acetate 4/1 | 98.5 | — |
| XVIII | 48 | 1.58 | 0.42 | diethylene glycol | 96.0 | 2 |
| XIX | 48 | 1.58 | 0.42 | N-methyl-pyrrolidone | 96.0 | 2 |
| XX | 48 | 1.58 | 0.42 | isopropanol | 96.0 | 2 |
| XXII | 96 | 1.98 | 0.52 | n-propanol | 97.5 | — |
| XXIII | 24 | 1.24 | 0.31 | diethylene glycol | 98.45 | — |

Dispersion XVII to XXIII obtained as a result of the redispersion process is characterized in Table 9.

TABLE 9

| Sample | dispersion characteristics |
|---|---|
| XVII | viscous and flocked |
| XVIII | very thick dispersion |
| XIX | very thick dispersion |
| XX | very thick dispersion |
| XXII | strongly flocked |
| XXIII | homogeneous flowing dispersion |

The complex viscosity $\eta^*$ of Sample XXIII was determined with a AR1000 cone and plate Rheometer at 25° C. and frequencies of 10, 1 and 0.1 Hz to be 1000 Pa.s, 5000 Pa.s and 40,000 Pa.s respectively.

Screen printing was carried out with sample XXIII with a P59 screen on a subbed polyethylene terephthalate support. The surface resistivity, determined as disclosed for layers coated with samples XIII, XIV, XV and XVI, and the optical density measured with a MACBETH™ T924 densitometer through a visible filter are given in Table 10.

TABLE 10

| Sample | Mesh Used In Screen Printing | Surface Resistivity [Ω/Square] | Optical Density [Visible Filter] |
|---|---|---|---|
| XXIII | P59 | 370 | 0.11 |

EXAMPLE 8

Preparation of Driographic Printing Inks of Samples XXIV to XXVII

The driographic printing inks of samples XXIV to XXVII were prepared by ball-milling for 20 hours the ingredients given in Table 11 for the particular sample, the PEDOT/PSS being used in the form of a freeze-dried powder. In the case of sample XXIV, the rosin was first dissolved in water with the help of monoethanolamine, then the freeze-dried PEDOT/PSS powder and then the other ingredients prior to ball-milling.

In the cases of samples XXV to XXVII, the rosin was first dissolved in an isopropanol/water mixture with the help of monoethanolamine and after the other ingredients were added subjected to 20 hours ball-milling.

TABLE 11

| Sample | XXIV | XXV | XXVI | XXVII |
|---|---|---|---|---|
| ball milling duration [h] | 20 | 20 | 20 | 20 |
| I-B PEDOT/PSSA [g] | 2.38 | 2.38 | 2.38 | 2.38 |
| water [g] | 76.72 | 91.16 | 91.16 | 91.16 |
| isopropanol [g] | 10.00 | 1.24 | 1.24 | 1.24 |
| NH$_4$OH [g] | 6.00 | 0.05 | 0.05 | 0.05 |
| styrene-maleic anhydride resin [g] | 0.73 | 0.73 | 0.73 | 0.73 |
| JONREZ ™ SM700 [g] | — | 1.44 | — | — |
| JONREZ ™ SM705 [g] | 1.46 | — | 1.44 | — |
| JONREZ ™ SM729 [g] | — | — | — | 1.44 |
| monoethanolamine [g] | 0.13 | 0.55 | 0.55 | 0.55 |

TABLE 11-continued

| Sample | XXIV | XXV | XXVI | XXVII |
|---|---|---|---|---|
| pH after dissolving | — | 8.5 | 8.5 | 8.5 |
| NEOCRYL ™ BT24 [g] | 0.40 | 0.40 | 0.40 | 0.40 |
| KLUCEL ™ H [g] | 0.63 | 0.63 | 0.63 | 0.63 |
| butylcarbitol [g] | 0.70 | 0.70 | 0.70 | 0.70 |
| CERIDUST ™ 130 [g] | 0.25 | 0.25 | 0.25 | 0.25 |
| Surfactant No 9 [g] | 0.50 | 0.50 | 0.50 | 0.50 |

EXAMPLE 9

Pinting Tests 100 sheet ink acceptance tests were carried out on an ABDick 9860 press on which was mounted a PRESSTEK™ Pearl Dry printing plate with 80 g/m² offset press paper with every fifth sheet an AGFA™ T474 transparex sheet from AGFA-GEVAERT N.V. Good print quality was obtained with Samples XXIV to XXVII with Sample XXVI, in particular, giving a very detailed print in which no image background was observable.

The present invention may include any feature or combination of features disclosed herein either implicitly or explicitly or any generalization thereof irrespective of whether it relates to the presently claimed invention. In view of the foregoing description, it will be evident to a person skilled in the art that various modifications may be made within the scope of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A freeze dried, redispersible or soluble product comprising a polyanion and a polymer or copolymer of a substituted or unsubstituted thiophene wherein said product is a dried product or a paste.

2. A product according to claim 1 wherein the concentrated dispersion or paste has a solids content higher than 10% by weight.

3. A product according to claim 1 wherein the polymer of a substituted or unsubstituted thiophene is represented by formula (I):

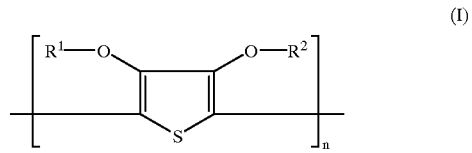

wherein n is larger than 1 and each of $R^1$ and $R^2$ independently represents hydrogen or an optionally substituted $C_{1-4}$ alkyl group or together represent an optionally substituted $C_{1-4}$ alkylene group or an optionally substituted cycloalkylene group, preferably an ethylene group, an optionally alkyl-substituted methylene group, an optionally $C_{1-12}$ alkyl- or phenyl-substituted ethylene group, a 1,3-propylene group or a 1,2-cyclohexylene group.

4. A product according to claim 1 wherein the polyanion is the anion of poly(styrene sulphonate) or of a copolymer thereof with styrene.

5. A method for making an antistatic or electroconductive layer or pattern comprising the steps of:
   redispersing or diluting a redispersible or soluble product obtained by freeze drying an aqueous dispersion of a latex comprising a polyanion and a polymer or copolymer of a substituted or unsubstituted thiophene product by adding water or an organic solvent so as to obtain a solution or dispersion;
   optionally adding other ingredients to the solution or dispersion; and
   applying the solution or dispersion to an object.

6. A method for making an antistatic or electroconductive layer or pattern comprising the steps of:
   redispersing or diluting a redispersible or soluble product obtained by freeze drying an aqueous dispersion of a latex comprising a polyanion and a polymer or copolymer of a substituted or unsubstituted thiophene product by adding water or an organic solvent so as to obtain a printing ink;
   optionally adding other ingredients to the printing ink; and
   applying the printing ink to an object.

7. A method for making an electroconductive layer or pattern comprising the steps of:
   redispersing or diluting a freeze dried, redispersible or soluble product comprising a polyanion and a polymer or copolymer of a substituted or unsubstituted thiophene by adding water or an organic solvent so as to obtain a solution or dispersion;
   optionally adding other ingredients to the solution or dispersion; and
   applying the solution or dispersion to an object,
wherein the layer or pattern has a surface resistivity lower than $10^6$ Ω/square.

8. A method for making an antistatic layer or pattern comprising the steps of:
  redispersing or diluting a redispersible or soluble product obtained by freeze drying an aqueous dispersion of a latex comprising a polyanion and a polymer or copolymer of a substituted or unsubstituted thiophene by adding water or an organic solvent so as to obtain a solution or dispersion;
  optionally adding other ingredients to the solution or dispersion; and
  applying the solution or dispersion to an object,
wherein the layer or pattern has a surface resistivity of at least $10^6$ Ω/square.

9. A coating solution or dispersion comprising a product comprising a redispersible or soluble product obtained by freeze drying an aqueous dispersion of a latex comprising a polyanion and a polymer or copolymer of a substituted or unsubstituted thiophene.

10. A coating solution or dispersion according to claim 9 further comprising water or an organic solvent.

11. A coating solution or dispersion according to claim 9 wherein the concentration of the product is at least 5% by weight of the coating solution or dispersion.

12. A coating solution or dispersion according to claim 9 wherein the concentration of the product is at least 10% by weight of the coating solution or dispersion.

13. A coating solution or dispersion according to claim 9 further comprising a binder or a thickener.

14. A process for the use of a coating solution or dispersion comprising a redispersible or soluble product obtained by freeze drying an aqueous dispersion of a latex comprising a polyanion and a polymer or copolymer of a substituted or unsubstituted thiophene comprising the step of preparing an antistatic or electroconductive layer.

15. A printing ink comprising a product comprising a redispersible or soluble product obtained by freeze drying an aqueous dispersion of a latex comprising a polyanion and a polymer or copolymer of a substituted or unsubstituted thiophene.

16. A printing ink according to claim 15 further comprising water or an organic solvent.

17. A printing ink according to claim 15 wherein the concentration of the product is at least 10% by weight of the ink.

18. A printing ink according to claim 15, wherein the concentration of the latex comprising a polyanion and a polymer or copolymer of a substituted or unsubstituted thiophene is at least 10% by weight of the printing ink.

19. A printing ink according to claim 15 further comprising a binder or a thickener.

20. A printing ink according to claim 15 wherein said printing ink is a driographic printing ink.

21. A process for the use of a printing ink comprising a redispersible or soluble product obtained by freeze drying an aqueous dispersion of a latex comprising a polyanion and a polymer or copolymer of a substituted or unsubstituted thiophene comprising the step of printing an antistatic or electroconductive layer.

* * * * *